March 28, 1944.  C. E. HUNZIKER  2,345,259
SWINGABLE FILTER
Filed July 17, 1941    5 Sheets-Sheet 1

INVENTOR.
CHARLES E. HUNZIKER
BY
Richards & Geier
ATTORNEYS

March 28, 1944.   C. E. HUNZIKER   2,345,259
SWINGABLE FILTER
Filed July 17, 1941   5 Sheets-Sheet 2

INVENTOR.
CHARLES E. HUNZIKER
BY
Richards & Geier
ATTORNEYS

March 28, 1944.  C. E. HUNZIKER  2,345,259
SWINGABLE FILTER
Filed July 17, 1941  5 Sheets-Sheet 3

INVENTOR.
CHARLES E. HUNZIKER
BY
Richards & Geier
ATTORNEYS

March 28, 1944.    C. E. HUNZIKER    2,345,259
SWINGABLE FILTER
Filed July 17, 1941    5 Sheets-Sheet 4

INVENTOR.
CHARLES E. HUNZIKER
BY
Richards & Geier
ATTORNEYS

March 28, 1944.　　C. E. HUNZIKER　　2,345,259
SWINGABLE FILTER
Filed July 17, 1941　　5 Sheets-Sheet 5

INVENTOR.
CHARLES E. HUNZIKER
BY
Richards & Geier
ATTORNEYS

Patented Mar. 28, 1944

2,345,259

UNITED STATES PATENT OFFICE 2,345,259

SWINGABLE FILTER

Charles E. Hunziker, Paterson, N. J.

Application July 17, 1941, Serial No. 402,746

6 Claims. (Cl. 210—188)

This invention relates to a filter for the clarification of liquids which may be used with or without filter aids on practically any type of liquid.

Such filters are usually composed of a plurality of filter frames directing the circulation of the liquid to be filtered and replaceable filter media situated between the filter frames which may or may not be provided with a coating of a filter aid during the filtering operation.

The filter frames and sheets usually extend vertically and are clamped between two covers during the filtering, the frames being supported upon horizontal rods when the filter is not in use. This arrangement is most satisfactory for permitting a quick insertion and removal of the filter media, but in many instances it makes it impossible to remove all of the filtered liquid from the filter and to distribute the filter aid uniformly upon the filter media.

On the other hand, a horizontal arrangement of the filter frames and media would make it very difficult to remove the used filter media and replace them by new ones and to clean the filter frames prior to a new filtering operation.

An object of the present invention is the provision of a filter which is so constructed that during the filtering operation the liquid to be filtered will easily circulate through the entire filter and may be removed therefrom in its entirety and that all the parts of the filter are easily and quickly accessible when the filter is not in use, so that its frames can be cleaned and the used filter media substituted by new ones within the shortest possible time.

Other objects of the present invention will become apparent in the course of the following specification.

The objects of the present invention may be realized through the provision of a filter which is so constructed that its filter frames and media, such as paper, asbestos or cloth sheets, extend horizontally one above the other while the filter is being operated and that they may be moved to vertical positions as soon as the operation of the filter is completed, for the purpose of facilitating a quick cleaning of the filter and a quick substitution of the used filter sheets.

The covers and the frame-supporting rods of the filter are connected with bars swingably mounted upon a stand, so that the filter frames may be swung conveniently from a horizontal operation position to a vertical loading position, and vice versa. The swinging parts of the filter also carry means connecting the filter frames with the liquid-supplying and circulating means in the operating position of the filter.

The invention will appear more clearly from the following detailed description when taken in connection with the accompanying drawings showing, by way of example, preferred embodiments of the inventive idea.

Figure 1:
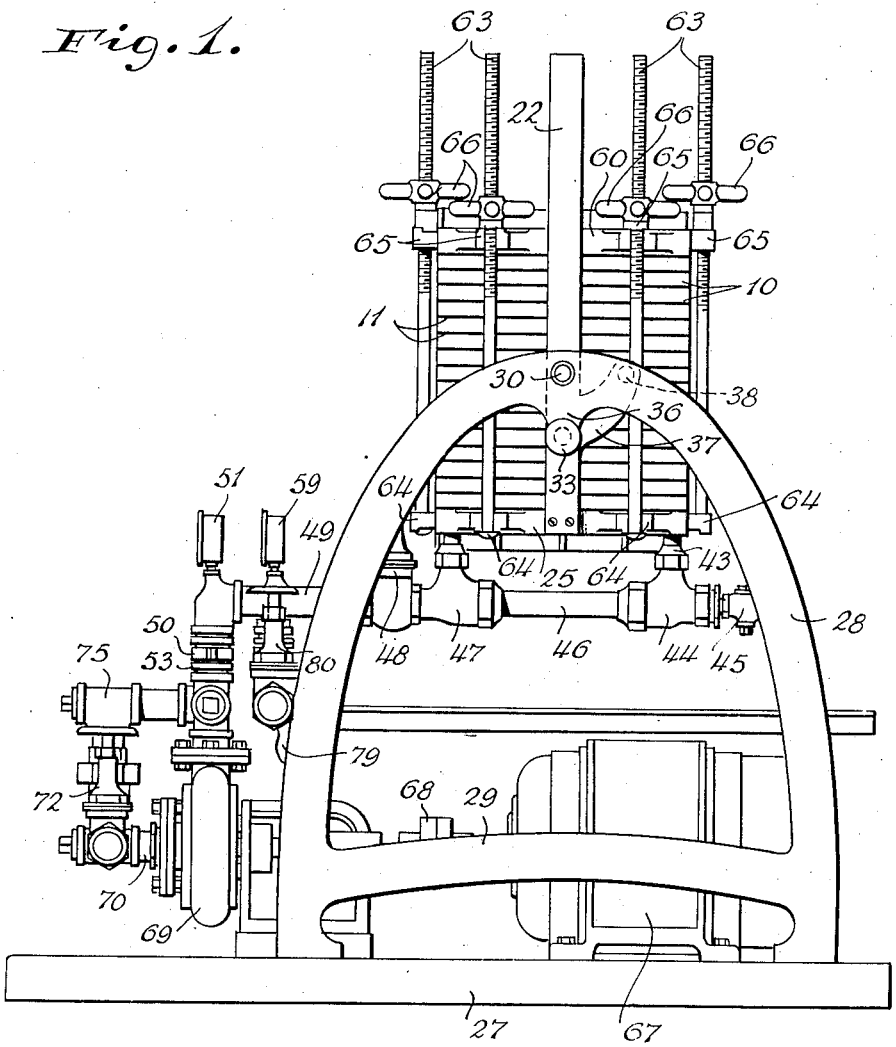
Figure 1 is a side view of the filter constructed in accordance with the principles of the present invention in its operating position.

The filter shown in the drawings includes a plurality of filter plates or filter frames 10. Any suitable number of these frames may be used and they extend between the usual filter sheets 11 when the filter is being operated.

Figure 4:
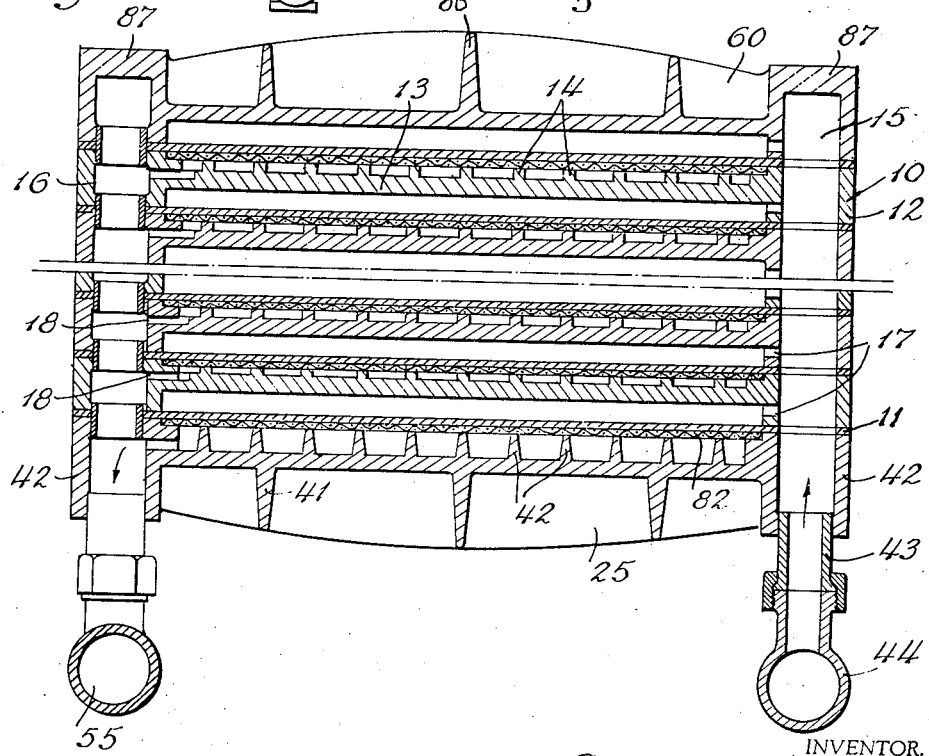
Figure 4 is a section along the line 4—4 of Figure 3, on an enlarged scale.
Figure 7:
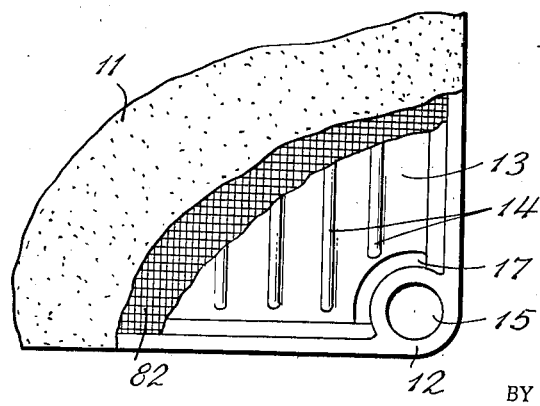
Figure 7 shows a part of a filter plate and filter sheet.

Each of the filter frames 10 is substantially square in form and is provided with sleeves 12 at its four corners (Figs. 4 and 7). Each frame 10 has an inner web or plate 13 carrying ribs 14 which support a wire screen 82.

The sleeves 12 of the frames 10 may be placed one over the other to form two inlet passages 15 and two outlet passages 16 for the circulating liquid. The inner spaces between the webs 13 are in communication with the passages 15 by means of inlet slots 17 which are formed in the plates 10 close to the sleeves 12. Outlet slots 18 are provided in the frames 10 to connect the inner spaces with the outlet passages 16.

Figure 5:
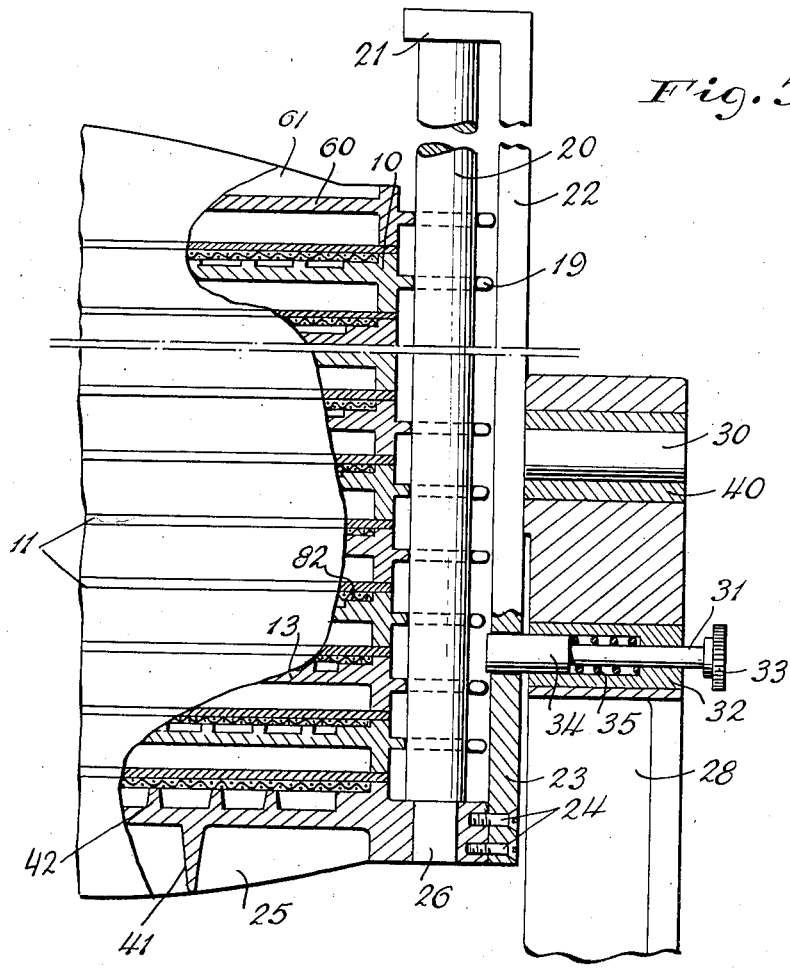
Figure 5 is a section along the line 5—5 of Figure 3 on an enlarged scale.

Each of the frames 10 is provided with two projections 19 situated on opposite sides of the frame and engaging supporting rods 20 (Fig. 5). The projections 19 ride upon the rods 20 and thus can support the frames 10 when the frames are in their vertical positions.

Figure 2:
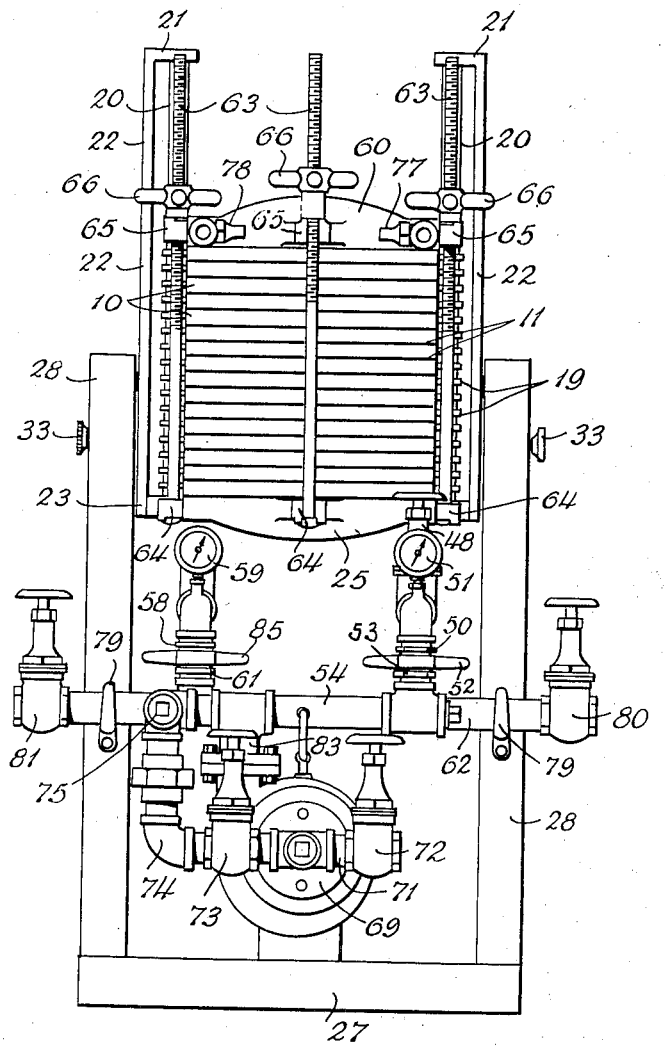
Figure 2 is a front view of the filter.

As shown in Figures 2 and 5, each of the supporting rods 20 is firmly connected at one of its ends with an angular end 21 of an elongated bar 22. The two bars 22 are situated on opposite sides of the frame assembly and have ends 23 which are connected by screws 24 with a stationary cover 25. The rods 20 are provided with end pieces 26 fitting into suitable openings provided in lateral extensions of the stationary cover 25.

Figure 6:
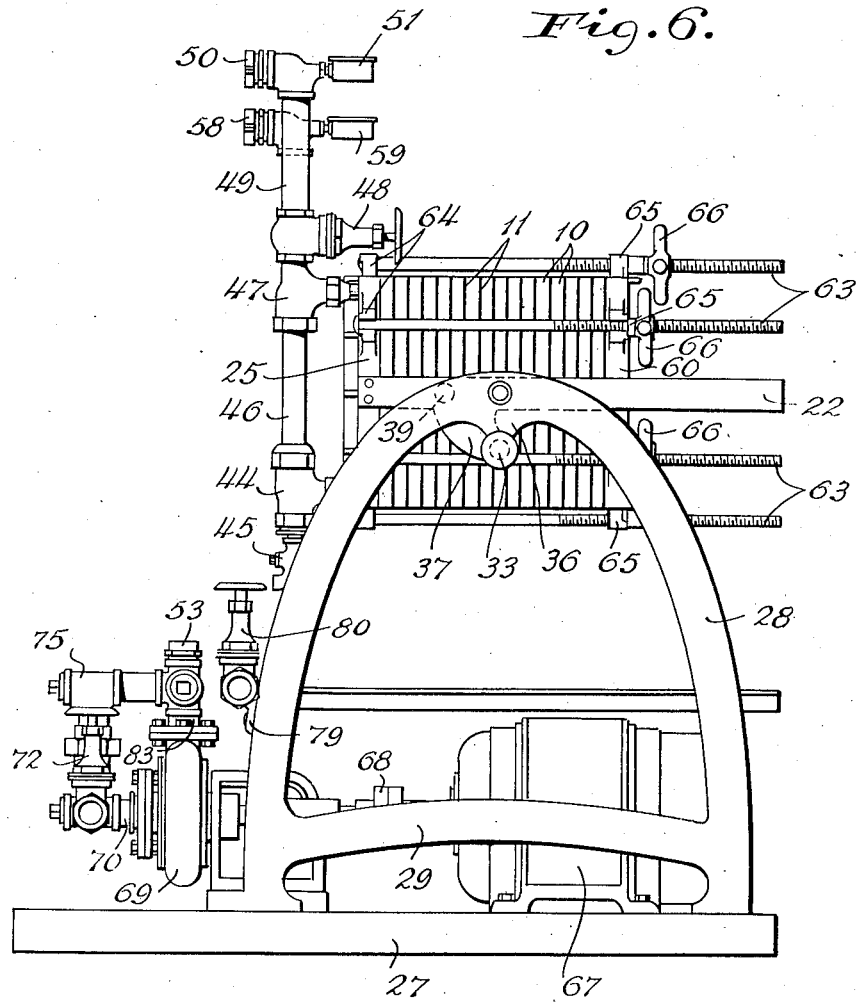
Figure 6 is a side view showing the filter in its horizontal loading position.

The swingable connection between the bars 22 and the support of the machine is illustrated in Figures 1, 5 and 6.

The machine includes a bottom plate or foundation 27 which carries two stands or supports 28, each of which, preferably, has the form of an inverted V or U in side elevation and is provided with a cross-bar 29.

The upper end of each stand 28 is provided with a sleeve 40 (Fig. 5) serving as a bearing for a swivel pin 30 which is integral with its bar 22. Due to this arrangement, the bars 22 and the parts connected therewith may swing conveniently upon the stands 28.

The bars 22 are locked in their horizontal and vertical positions by means of lock-pins each of which includes a pin 31 situated in a sleeve 32 which is provided in a stand 28. The outwardly projecting end of the pin 31 carries a handle portion or knob 33, while its inner end is integral with a cylindrical bolt 34 which is pressed against the bar 22 by a spring 35. The sleeves 32 are situated in downwardly extending projections 36 of the stands 28 (Figs. 1 and 6).

Each of the bars 22 is provided with a curved hook-shaped extension 37, the outer end of which carries an opening 38 into which the bolt 34 may be fitted (Fig. 1). Each bar 22 is provided with another opening 39 of the same diameter (Fig. 6).

The two openings 38 and 39 are so located in relation to each other that, when the bolts 34 are situated within the openings 39, the filter frames 10 extend horizontally, as indicated in Figure 1. On the other hand, when the bolts 34 are situated within the openings 38, then the filter plates 10 occupy the vertical position shown in Figure 6.

The stationary cover 25 which is firmly connected with the bars 22 by the screws 24, includes a plurality of outwardly extending partitions 41 and inner ribs 42 (Fig. 4). The cover 25 is provided at its four corners with sleeves 42 forming a continuation of the sleeves 12 of the frames 10.

One of the sleeves 42, which is in communication with one of the passages 15, is connected by a short pipe 43 with an inlet manifold comprising a T-connection 44. One end of the T-connection 44 is connected with a drain valve 45 (Fig. 1). The other end of the T-connection 44 is connected with one end of a pipe 46, while the other end of the pipe 46 is connected with another T-connection 47. The manifold 47 is in communication with the other one of the passages 15 and is connected to a filter inlet valve 48. A pipe 49 having an open end flange 50 (Fig. 6) carries an inlet gauge 51 of the usual type and is connected with the valve 48.

The pipe 49 provided in the flange 50 is raised to a vertical position when the filter frames are swung from the operating position shown in Figure 1 to the loading position shown in Figure 6. In the operating position, the flange 50 of the pipe 49 is connected by a union 52 (Fig. 2) with an open flange 53 of a stationary pipe 54.

Figure 3:
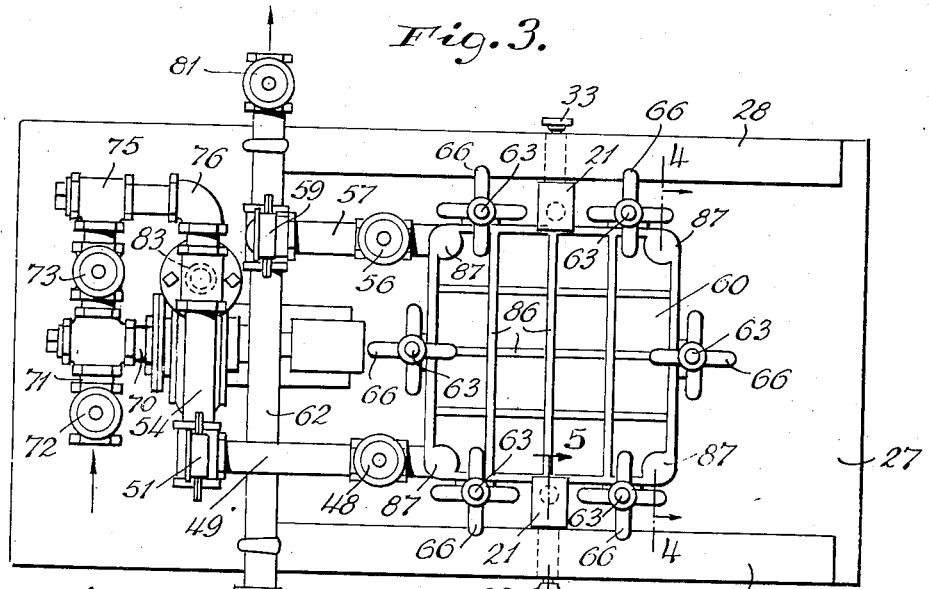
Figure 3 is a top view of the filter.

The outlet passages 16 communicate with two outlet T-connections 55, one of which is shown in Figure 4. The arrangement on the outlet side is substantially the same as on the inlet side, namely, a pipe (not shown) interconnects the two T-connections 55 and one of these manifolds is connected to a drain valve which is not shown in the drawings, while the other manifold is connected to the filter outlet valve 56 (Fig. 3).

A pipe 57 having an open end flange 58 (Fig. 6) carries an outlet pressure gauge 59 and is connected with the valve 56.

As indicated in Figure 6, the pipe 57 carrying the gauge 59 is raised vertically along with the pipe 49 when the filter frames 10 are swung to the loading position. A union 85 (Fig. 2) is used to connect the flange 58 of the pipe 57 with a flange 61 of a stationary pipe 62.

The frames 10 and the filter sheets 11 interposed between the frames 10 are clamped between the stationary cover 25 and a movable cover 60. As shown in Figures 3 and 4, the movable cover 60 is provided with outer partitions or ribs 85 and four sleeves 87 situated at the four corners of the cover 60 and constituting the end walls of the passages 15 and 16 formed by the sleeves 12.

The two covers 25 and 60 are clamped by six tie rods 63. As shown in Figure 3, two tie rods 63 are situated upon each of the two sides of the frames 10, while one tie rod is situated in front of the frames 10 and another tie rod is located in the rear of the frames 10. The ends of the tie rods 63 are held in jaws or projections 64 formed in the stationary cover 25 (Fig. 1) and projections 65 provided in the movable cover 60.

The tie rods 63 are threaded and carry wing nuts 66 which are used to press the movable cover 60 against the frames 10 and the stationary cover 25.

One of the sleeves 65 carries a blow down pipe 77 (Fig. 2) which is in communication with one of the inlet passages 15. A sample valve 78 carried by another sleeve 65 is in communication with one of the outlet passages 16.

The base 27 carries an electric motor 67 which is connected by a coupling 68 with a pump 69 (Figs. 1 and 6). The pump 69 is connected by a pipe 70 with a horizontal pipe 71 carrying a pump inlet valve 72 and a by-pass valve 73 (Figs. 2 and 3). The by-pass valve 73 is connected with an angular upwardly extending pipe 74 having a member 75 used for transfer purposes and connected by an angular pipe 76 with the horizontal pipe 54.

The horizontal pipe 62 is carried by brackets 79 which are attached to the stands 28. A pipe 83 connects the pump 69 with the pipe 54. The pipe 62 carries a recirculation valve 80 and an outlet valve 81.

The filter is operated as follows:

In the loading position shown in Figure 6, the bolts 34 are situated in the openings 38 of the projections 37. In this position, the wing nuts 66 which are in screw thread engagement with the tie-rods 63, may be conveniently retracted from the movable cover 60, so that the frames 10 will not be subjected to any pressure and will hang loosely upon the rods 20. The filter frames 10 may be conveniently cleaned and new filter sheets 11 may be inserted between the frames 10. In order to set the filter for operation, the wing nuts 66 are turned and pressed against the movable cover 60 until the frames 10 and the sheets 11 are firmly clamped between the stationary cover 25 and the movable cover 60.

Then the bolts 34 are withdrawn from the openings 38 and the filter frames 10 are swung from the vertical position shown in Figure 6 to the horizontal position shown in Figure 1. The pipes 49 and 57 and the parts connected thereto swing along with the frames 10 and the bars 22 and are moved to positions in which the open end 50 of the pipe 49 is directly above the open end 53 of the stationary pipe 54, while the open end 58 of the pipe 57 is situated above the open end 61 of the stationary pipe 62. Then the ends 50 and 53 of the pipes 49 and 54 are connected with each other in a fluid-tight manner by the union 52, while the ends 58 and 61 of the pipes 57 and 62 are joined by the union 85 (Fig. 2).

The filter aids are deposited upon the filter sheets 11 by operating the pump 69 and connecting a tank containing a filter aid solution (not shown) to the pump inlet valve 72. The solution will flow through the valve 72 and the pipe 71 into the pump 69 and thence through the pipes 83 and 54 into the pipe 49. The solution will reach the filter sheets 11 through the filter inlet valve 48, the T-connections 44 and 47, the connecting pipe 46, the inlet passages 15 of the filter frames 10 and the inlet slots 17 (Fig. 4). Filter aids will be deposited upon the sheets 11 and the water is removed through the outlet slots 18, the outlet passages 16 of the filter frames 10, the T-connections 55, the filter outlet valve 56, the pipes 57 and 62 and the outlet valve 81 (Fig. 3).

This filter may be used with any suitable type of filter aids, such as diatomaceous earth filters, activated carbons and filter aids having a cellulose base.

The filter is ready for use after the filter aids have been deposited; it may be used as a pre-filter or roughing filter with filter sheets consisting of filter paper, or as a final or polishing filter with asbestos pads as filter sheets.

The liquid to be filtered may circulate through the filter in the described manner. However, in order to establish a continuous circulation of the liquid, the recirculation valve 80 may be connected with the inlet valve 72 by any suitable pipe not shown in the drawings. Then the following closed circuit is established for the circulation of the liquid to be filtered.

Inlet valve 72, pipe 71, pump 69, pipe 83, pipe 54, pipe 49, filter inlet valve 48, T-connections 44 and 47, inlet passages 15, inlet slots 17, filter sheets 11, outlet slots 18, outlet passages 16, T-connections 55, filter outlet valve 56, pipe 57, pipe 62, recirculation valve 80 and inlet valve 72.

The pressure of the flowing liquid may be conveniently observed upon the gauges 51 and 59, and the valve 78 may be used to take samples of the circulating liquid. The filtered liquid may be removed through the outlet valve 81 and the blow down valve 77 may be connected with a source of compressed air to remove the remaining liquid out of the filter and to blow the filter dry. Drain valves 45 may be also used for the removal of the liquid in the filter.

If necessary, the pump 69 may be short-circuited and used to circulate a liquid through the pipes 83, 54 and 76, the member 75, the pipe 74, the by-pass valve 73 and the pipes 71 and 70; in that case, the member 75 may be connected to any suitable outer liquid-circulating circuit.

It is apparent that the specific illustration shown herein has been given by way of illustration and not by way of limitation, and that the structures above described are subject to wide variations and modifications without departing from the scope or intent of the invention. All of such variations and modifications are to be included within the scope of the present invention.

What is claimed is:

1. A filter having a plurality of filter frames adapted to be placed side by side, two covers on opposite sides of said filter frames, said frames and said covers having interengaging sleeves provided with openings which communicate with spaces between the frames, said sleeves forming inlet and outlet passages for a circulating liquid, means engaging said covers for clamping and unclamping said filter frames, projections upon opposite sides of said frames, supporting rods extending on two opposite sides of said frames, said projections riding upon said supporting rods in a loading position of said frames to support said frames individually in said position when said frames are unclamped and hang downwardly, at least one bar extending parallel to said supporting rods and at a distance therefrom, said bar having ends firmly connected to the ends of one of said supporting rods, said bar having a locking opening formed therein for locking said bar in said loading position, an extension piece carried by said bar and having another locking opening formed therein for locking said bar in an operating position, a swivel pin carried by said bar, at least one stand comprising a support for said swivel pin, a locking bolt carried by said stand and adapted to project into any one of said locking openings for locking said bar along with said frames in said loading and operating positions, a spring situated within said stand and engaging said locking bolt for pressing it against said bar, and a pin connected with said locking bolt and projecting outside of said stand.

2. A filter having a plurality of filter frames, two covers on opposite sides of said filter frames, said frames and said covers having interengaging sleeves provided with openings which communicate with spaces between the frames, said sleeves forming inlet and outlet passages for circulating liquid means pressing one of said covers against said filter frames and the other cover to clamp said filter frames between said covers, projections upon opposite sides of said frames, supporting rods extending on two opposite sides of said frames, said projections riding upon said supporting rods in a loading position of said frames to support said frames individually in said loading position when said frames are unclamped and hang downwardly, a bar extending parallel to said supporting rods and at a distance therefrom, said bar having an end firmly connected with said other cover, a swivel pin carried by said bar, at least one stand comprising a bearing supporting said swivel pin, two locking openings formed in said bar, and a locking bolt connected with said stand and adapted to project into any one of said two locking openings to lock said bar in any one of two positions, said two locking openings being so located that said two positions correspond to a loading position and an operating position located at an angular distance of 90 degrees from said loading position.

3. A filter having a plurality of filter frames adapted to be placed side by side, two covers on opposite sides of said filter frames, said frames and said covers having interengaging sleeves provided with openings which communicate with spaces between the frames, said sleeves forming inlet and outlet passages for a circulating liquid, means engaging said covers for clamping and unclamping said filter frames, projections upon two opposite sides of said frames, two parallel supporting rods extending below said projections which ride upon said supporting rods in a loading position of said frames to support said frames individually in said position when said frames are unclamped and hang downwardly, two bars extending parallel to said supporting rods and at a distance therefrom, said bars having ends firmly connected to the ends of said supporting rods, each of said bars having two locking openings formed therein, a separate swivel pin carried by each bar, two stands, each of said stands having an opening formed therein for supporting a separate swivel pin, and a separate lock carried by each stand and engaging any one of said two locking openings, whereby said frames along with said supporting rods and said bars may be swung from said loading position through 90 degrees to an operating position and vice versa.

4. The combination of a filter having a plurality of filter frames, two covers on opposite sides of said filter frames, said filter frames and said covers having interengaging sleeves provided with openings which communicate with spaces between the frames, said sleeves forming inlet and outlet passages for a circulating liquid, filter medium carried by said filter frames and communicating with said inlet and outlet passages, whereby filtration may take place by the flow of said circulating liquid through said filter medium, and means pressing one of said covers against said filter frames and the other cover to clamp said filter frames between said covers, with a sample valve carried by said one cover and communicating with one of said passages, a blow down valve carried by said one cover and communicating with another one of said passages, a separate T-connection communicating with each one of said passages, means connected with said other cover and carrying said T-connections, a drain valve connected with one of said T-connections, a filter inlet valve connected with that T-connection which is in communication with an inlet passage, a filter outlet valve connected with that T-connection which is in communication with an outlet passage, a conduit having an open end and another end connected with said filter inlet valve, another conduit having an open end and another end connected with said filter outlet valve, gauges carried by said conduits, a support, means swingably connecting said other cover with said support for swinging said filter frames along with said valves, said T-connections and said conduits from a loading position to an operating position and vice versa, said filter frames extending vertically in said loading position and extending horizontally in said operating position, a system of pipes connected with said support and operatively communicating with the open ends of said conduits in said operating position, and a pump interposed in said system of pipes.

5. The combination of a filter having a plurality of filter frames having interengaging sleeves provided with openings which communicate with spaces between the frames, said sleeves forming at least one inlet passage and at least one outlet passage for a circulating liquid, filter medium carried by said filter frames and communicating with said inlet and outlet passages, whereby filtration may take place by the flow of said circulating liquid through said filter medium, and means clamping said filter frames, with a base, at least one stand upon said base, means swingably connecting said filter frames with said stand for swinging said filter frames from a vertical loading position to a horizontal operating position and vice versa, a pump carried by said base for the circulation of said liquid, a pipe system, an inlet valve at one end of said pipe system, the other end of said pipe system being connected with said pump, a pipe having a round flange enclosing an open end of said pipe, another pipe connecting the first-mentioned pipe with said pump, a third pipe having a round flange enclosing an open end thereof, an outlet valve connected with said third pipe, and means connected with said filter frames and swingable therewith, the last-mentioned means being in communication with said inlet and outlet passages and engaging said round flanges of the first and third-mentioned pipes in said operating position to connect these pipes with said passages.

6. The combination of a filter having a plurality of filter frames having interengaging sleeves provided with openings which communicate with spaces between the frames, said sleeves forming at least one inlet passage and at least one outlet passage for a circulating liquid, filter medium carried by said filter frames and communicating with said inlet and outlet passages, whereby filtration may take place by the flow of said circulating liquid through said filter medium, and means clamping said filter frames, with a base, at least one stand upon said base, means swingably connecting said filter frames with said stand for swinging said filter frames from a vertical loading position to a horizontal operating position and vice versa, a pump carried by said base for the circulation of said liquid, a pipe system, an inlet valve at one end of said pipe system, the other end of said pipe system being connected with said pump, a pipe having a round flange enclosing an open end of said pipe, another pipe connecting the first-mentioned pipe with said pump, a third pipe having a round flange enclosing an open end of said third pipe, an outlet valve connected with said third pipe, another pipe system connected with the first-mentioned pipe system and the first-mentioned pipe, and including a by-pass valve, a recirculation valve carried by the third pipe, and means connected with said filter frames and swingable therewith, the last-mentioned means being in communication with said inlet and outlet passages and engaging said round flanges of the first and third-mentioned pipes in said operating position to connect these pipes with said passages.

CHARLES E. HUNZIKER.